United States Patent [19]
Seddon

[11] 3,772,148
[45] Nov. 13, 1973

[54] NUCLEAR REACTOR FUEL ELEMENT SPACER GRID

[75] Inventor: Thomas Seddon, St. Anne's, Lancashire, England

[73] Assignee: United Kingdom Atomic Energy Authority, London, England

[22] Filed: Aug. 25, 1970

[21] Appl. No.: 66,711

[30] Foreign Application Priority Data
Sept. 3, 1969 Great Britain.................. 43,717/69

[52] U.S. Cl..................................... 176/78, 176/76
[51] Int. Cl............................ G21c 3/34, G21c 3/30
[58] Field of Search................................ 176/76, 78

[56] References Cited
UNITED STATES PATENTS

| | | | |
|---|---|---|---|
| 3,510,397 | 5/1970 | Zettervall............................ | 176/78 |
| 3,442,763 | 5/1969 | Chetter et al......................... | 176/78 |
| 3,379,618 | 4/1968 | Frisch................................ | 176/76 X |
| 3,380,890 | 4/1968 | Glandin et al........................ | 176/78 |
| 3,350,275 | 10/1967 | Venier et al......................... | 176/78 |
| 3,379,617 | 4/1968 | Andrews et al....................... | 176/78 |

Primary Examiner—Carl D. Quarforth
Assistant Examiner—Roger S. Gaither
Attorney—Larson, Taylor and Hinds

[57] ABSTRACT

A spacer grid for a nuclear reactor fuel assembly is of cellular form being constructed, for example, from two superimposed layers of cojoined tubular ferrules. Each of the fuel pins passes through a corresponding pair of ferrules in the two layers. Two circumferentially spaced rigid support members extend into one of each pair of ferrules and a single rigid support member extends into the other of the pair of ferrules. The fuel pin extending through each pair of ferrules contacts the rigid support members therein, the rigid support members being positioned at points on the corner of a triangle and the fuel pin being biassed into contact with the support members by a bow spring extending between the pair of ferrules.

10 Claims, 6 Drawing Figures

Patented Nov. 13, 1973

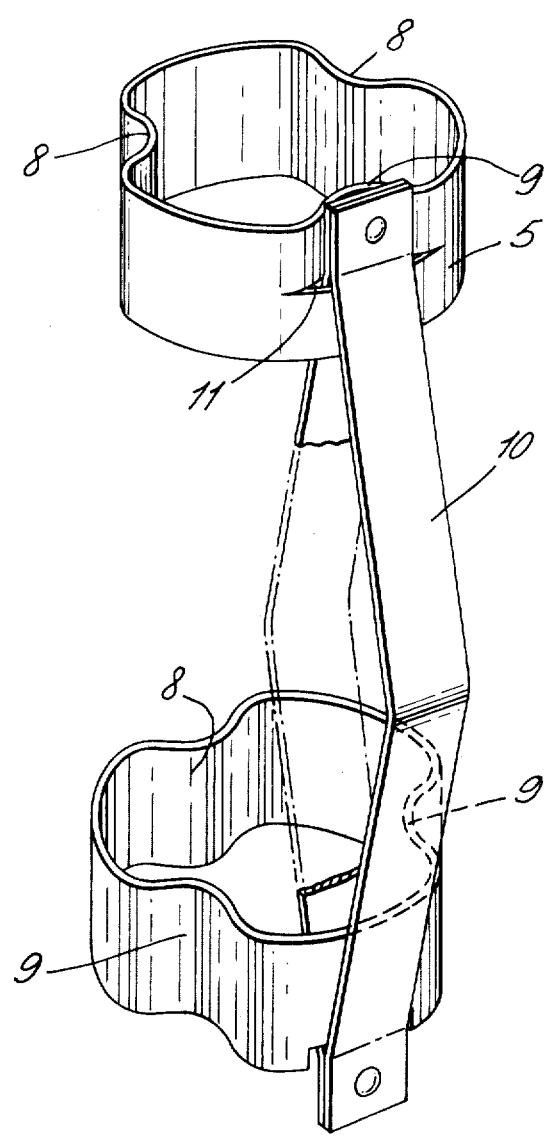

3,772,148

NUCLEAR REACTOR FUEL ELEMENT SPACER GRID

BACKGROUND OF THE INVENTION

This invention relates to nuclear reactor fuel assemblies and in particular to that kind of fuel assembly including a plurality of elongate fuel pins supported in a bundle with their longitudinal axes parallel. Such a fuel element assembly employs one or more spacer grids disposed intermediate the ends of the assembly and serving to restrict fuel pin movement within the spacer grid and to retain the correct location of the fuel pins in the assembly relative to one another.

In an early form of spacer grid the fuel pins were supported by opposed resilient members. This arrangement, however, constitutes an unstable "mass spring" arrangement in which fuel pin movement continues until the resulting spring deflection produces a force large enough to counteract the disturbance. No matter how stiff the resilient members microscopic movement of an oscillating nature will occur producing fretting of the fuel pins, that is wear of the fuel pins at the points of contact with the resilient members.

In another form of spacer grid the fuel pins are held against rigid support means by resilient members positioned in opposed relationship to the rigid support means. In this arrangement the spring force of the resilient member is chosen to ensure that the fuel pins do not break contact with the rigid support means and in particular to ensure that the fuel pins do not tap on the rigid support means as this results in severe fretting. Although vibration of the fuel pins within a spacer grid is minimised by this arrangement lateral oscillations of fuel pins between adjacent spacer grids in the assembly can still occur. Such oscillations will produce rubbing between the pin and the support means with a consequent fretting.

SUMMARY OF THE INVENTION

According to the present invention a spacer grid for a nuclear fuel assembly including a plurality of elongate fuel pins supported in a bundle with their longitudinal axes parallel is of cellular form, having openings through which the fuel pins extend, three substantially rigid support members extending into each of said openings, resilient means being provided in each opening in opposed relationship with said support members and located to bias a fuel pin in the opening against the support members, said support members being positioned so that at least one of the support members contacts the fuel pin at a point longitudinally spaced with respect to the longitudinal axis of the fuel pin from the points of contact of the other two support members with the fuel pin, the points of contact of the three support members with the fuel pin being at the corners of a triangle.

In the arrangement of the invention the three point support provided by the three rigid support members for each of the fuel pins ensures that each fuel pin makes full contact with all of the three rigid support members. The arrangement introduces a couple which opposes lateral oscillation of the fuel pins between adjacent spacer grids which minimises rubbing fretting of the fuel pins on the rigid support members.

Also the arrangement limits the amount of disturbance which is passed on from one intergrid section of the fuel assembly to the next and ensures correct alignment of the fuel pins within the spacer grids.

DESCRIPTION OF THE DRAWING

Embodiments of the invention will now be described by way of example with reference to the accompanying drawings in which:

FIG. 3 is a detail, in isometric form of the spacer grid shown in FIG. 1.

DESCRIPTION OF THE PREFERRED EMBODIMENTS

Figure 2:
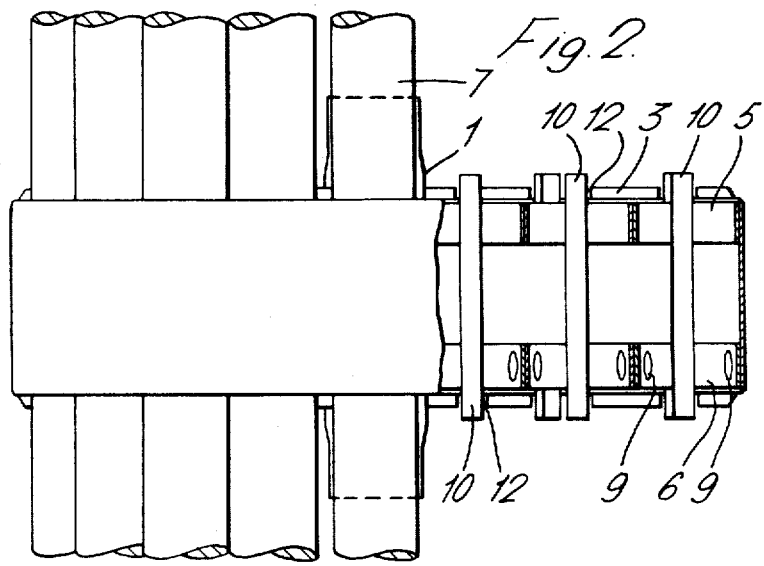
FIG. 2 is a side elevation of the spacer grid partly in section along the line II—II in FIG. 1.
Figure 1:
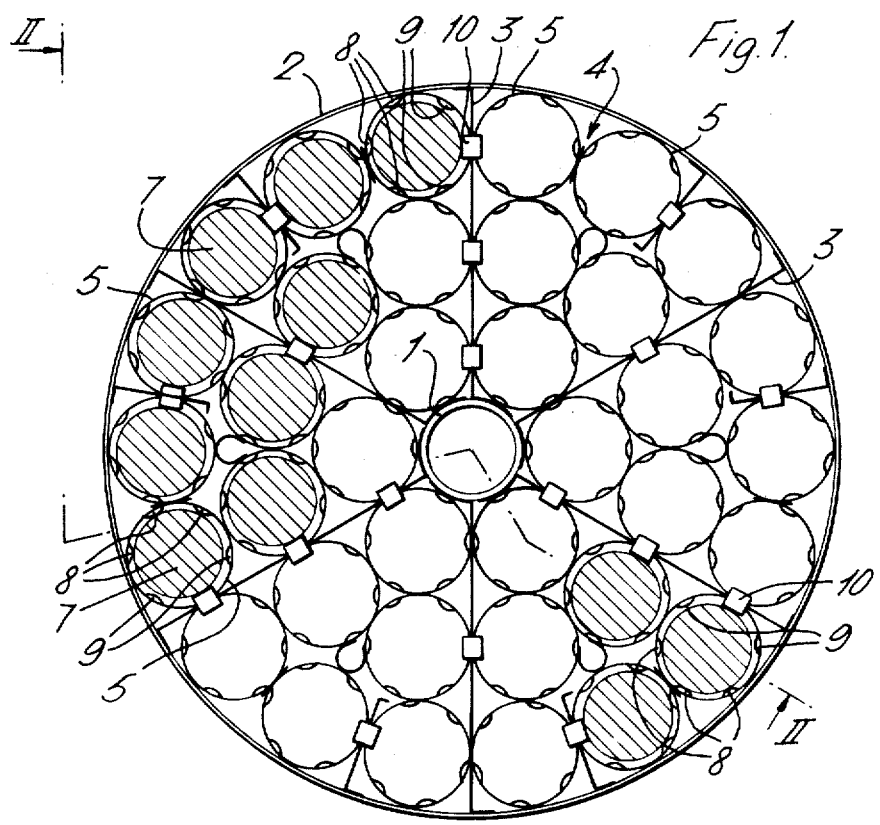
FIG. 1 is a plan view of a spacer grid in accordance with the invention.

The spacer grid shown in FIGS. 1 and 2 of the drawings comprises a central structural ferrule 1 and an outer circular band 2. The central ferrule 1 and the outer band 2 are joined by radial webs 3 which divide the area of the outer band 2 into eight sectors 4. Each sector 4 contains six tubular ferrules 5 at the upper face of the grid and six corresponding tubular ferrules 6 at the lower face of the grid. The components of the assembly, that is the central ferrule 1, the outer band 2, the radial webs 3 and the ferrules 5 and 6, are joined together by brazing or spot welding. The spacer grid provides lateral location for an assembly of elongate fuel pins 7 supported in a bundle with their longitudinal axes parallel. Each of the corresponding pairs of ferrules 5 and 6 is penetrated by a fuel pin 7, although for the sake of clarity only a few of the fuel pins 7 are shown in FIG. 1.

As shown in FIG. 3 two rigid support members 8 and a rigid back stop member 9 are formed in each of the upper ferrules 5. The support member 8 and the back stop member 9 being equispaced at 120° from one another. In the lower ferrules 6 there is formed a single rigid support member 8 and two rigid back stop members 9 also equispaced at 120° from each other. Double bow springs 10 are fitted over the webs 3 between the ferrules 5 and 6. Each bow spring 10 is fitted through slots 11 in the upper ferrules 5 below the back stop members 9 and engages in recesses 12 in the upper and lower edges of the radial webs 3. The bow springs 10 hold the fuel pins 7 in engagement with the two rigid support members 8 in the upper ferrules 5 and with the single rigid support member 8 in the lower ferrules 6.

The fuel pins 7 do not normally make contact with the back stop members 9 unless the bow springs 10 fail when the back stop members 9 serve to limit lateral movement of the fuel pins 7 away from the rigid support members 8.

Figure 4:
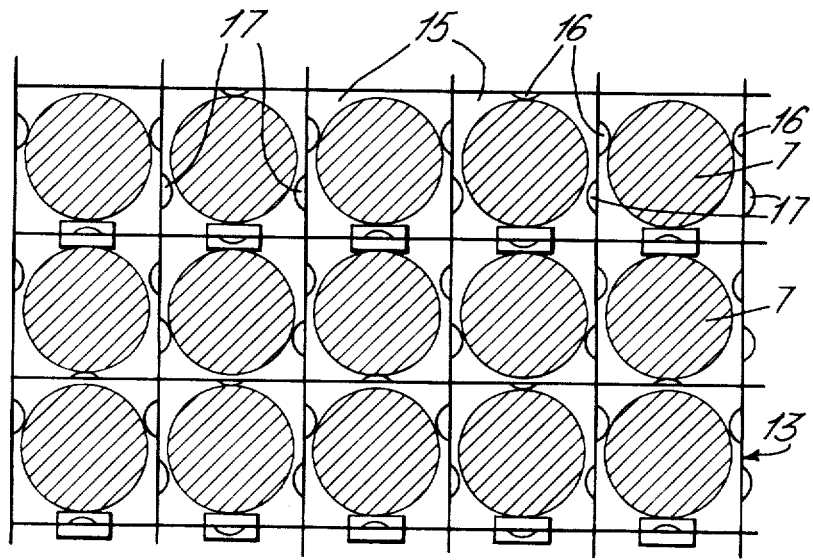
FIG. 4 is a plan view of part of a second form of spacer grid in accordance with the invention.
Figure 5:
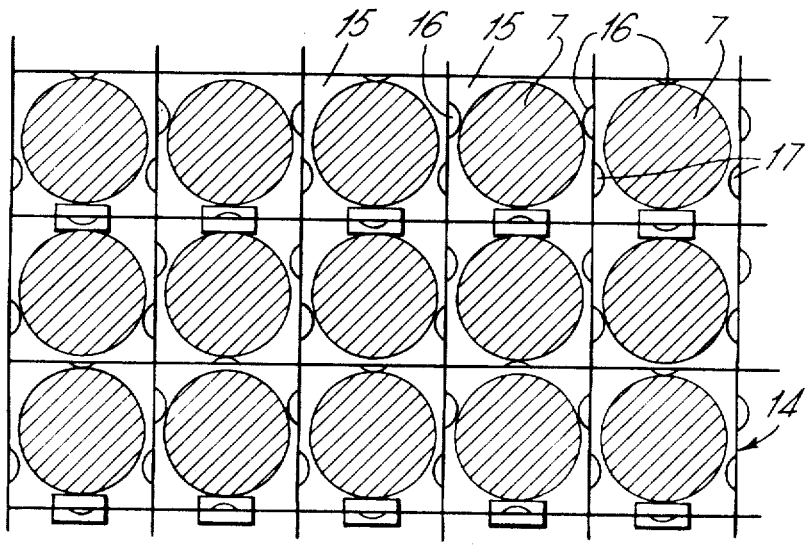
FIG. 5 is a sectional plan view at a lower level in the spacer grid shown in FIG. 4.
Figure 6:
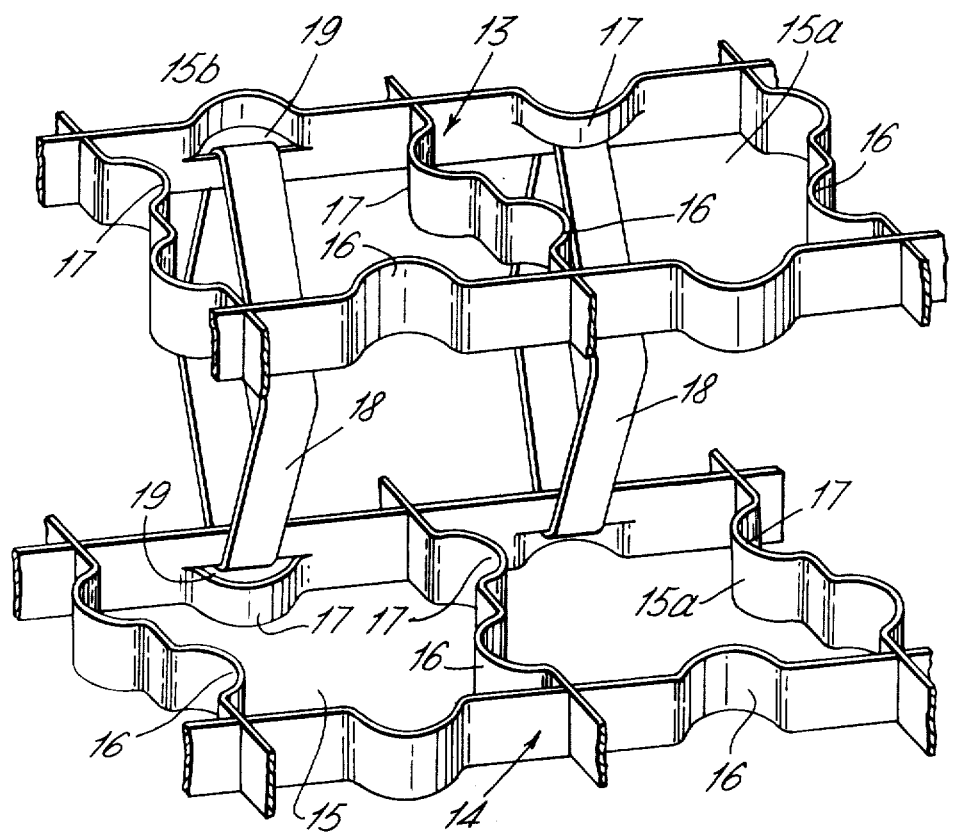
FIG. 6 is a detail, in isometric form, of the spacer grid shown in FIG. 4.

The spacer grid shown in FIG. 4, 5 and 6 of the drawings comprises an upper grid structure 13 and a corresponding lower grid structure 14 both of square lattice form. The upper and lower grid structures 13 and 14 are both made from thin strip material and are joined by an outer support band (not shown). Again the spacer grid provides lateral location for an assembly of fuel pins 7 supported in a bundle with their longitudinal axes parallel. The grid structures 13 and 14 have square openings 15, the fuel pins 7 extending longitudinally through corresponding openings 15 in the two grid structures 13 and 14. The strips forming the grid structures 13 and 14 are shaped to provide rigid support members 16 and rigid back stop members 17 extending into each of the openings 15. Double bow springs 18 extend longitudinally between the upper and lower grid structures 13 and 14. As shown in FIG. 6 the bow springs 18 are fitted in slots 19 in corresponding sides of the openings 15 in the upper and lower grid structures 13 and 14. Again referring to FIG. 6 in the opening referenced 15a of the upper grid structure 13 the associated bow spring 18 biases a fuel pin 7 into engagement with two rigid support members 16 which extend from opposite sides of the opening 15a. In the corresponding opening 15a of the lower grid structure 14 the bow spring 18 biases the fuel pin 7 into engagement with a single rigid support member 16 in the side of the opening 15a facing the bow spring 18.

The opening 15a in the upper grid structure 13 has a single back stop member 17 on the side of the opening containing the bow spring 18. The opening 15a in the lower grid structure 14 has two oppositely placed back stop members 17. Also in this arrangement the fuel pin 7 does not normally contact the back stop members 17 unless failure of the bow spring 18 occurs.

In the openings 15b adjacent the openings 15a of the upper and lower grid structures 13 and 14 the arrangement is reversed.

In the opening 15b of the upper grid structure 13 the associated bow spring biasses the fuel pin 7 into engagement with a single rigid support member 16 facing the bow spring 18. In the corresponding opening 15b of the lower grid structure 14 the bow spring 18 biasses the fuel pin 7 into engagement with two rigid support members 16 which extend from opposite sides of the opening 15b in the lower grid structure 14. The opening 15b in the upper grid structure 13 has two oppositely placed back stop members 17 and the opening 15b in the lower grid structure 14 has a single back stop member 17.

I claim:

1. A spacer grid for a nuclear reactor fuel assembly including a plurality of elongate fuel pins supported in a bundle with their longitudinal axes parallel, said spacer grid being of cellular form having openings through which the fuel pins will extend, no more than three substantially rigid support members extending into each of said openings and circumferentially spaced about said opening, resilient means being provided in each opening so as to be on a side of a single fuel pin in opposed relationship with said three support members and located to contact and bias said single fuel pin in the opening against the three support members, said support members being positioned so that a single port member will contact the single fuel pin at a point longitudinally spaced from, with respect to the longitudinal axis of the fuel pin, and circumferentially offset from, the points of contact of the other two support members with the fuel pin, the points of contact of the three support members with the fuel pin being at the corners of a triangle such that the three points of contact will be spaced circumferentially around on the surface of the fuel pin.

2. A spacer grid as claimed in claim 1 wherein said resilient means is adapted to contact the fuel pin at a point on the fuel pin intermediate between the point of contact of the one support member and the points of contact of the other two support members with the fuel pin, the resilient means being located to act on the fuel pin in opposition to the support members to bias the fuel pin into contact with all three of the support members.

3. A spacer grid as claimed in claim 1 comprising two superimposed layers of tubular ferrules, the ferrules in each layer being cojoined and the two layers of ferrules being supported in longitudinally spaced relationship in the spacer grid, whereby the fuel pins in a fuel assembly each will pass through a corresponding pair of ferrules, one in each layer, two circumferentially spaced rigid support members being formed extending inside one ferrule of each pair of ferrules, a single rigid support member being formed extending inside the second ferrule of the pair of ferrules, so that the two rigid support members in the one ferrule and the single rigid support member in the second ferrule of each pair of ferrules are positioned at the corners of a triangle, spring means being provided in association with each pair of ferrules acting in opposition to the rigid support members and adapted to bias the fuel pins against the rigid support members.

4. A spacer grid as claimed in claim 3 wherein the spring means is arranged to act on the fuel pins at a point longitudinally between the two support members in the one ferrule and the single support member in the second ferrule of each pair of ferrules.

5. A spacer grid as claimed in claim 3 wherein the spring means comprises a bow spring mounted longitudinally between the two ferrules of each pair of ferrules, whereby the bow springs are adapted to bear on the fuel pins intermediate between the two ferrules of each pair of ferrules.

6. A spacer grid as claimed in claim 3 wherein a stop member is formed extending inside the one ferrule of each pair of ferrules on the opposite side of the ferrule to the two rigid support members therein and two circumferentially spaced stop members are formed extending inside the second ferrule of each pair of ferrules on the opposite side of the second ferrule to the single rigid support member therein, such that the fuel pins will be spaced from the stop members in the ferrules when the fuel pins are in contact with the support members in the ferrules.

7. A spacer grid as claimed in claim 1 having two superimposed grid structures, each grid structure comprising a plurality of strip members intersecting at right angles to define rectangular openings in the grid structures, such that the fuel pins of a fuel assembly each will extend through a corresponding pair of openings in the two grid structures, each pair of openings having spring means acting from one side thereof so as to bias a fuel pin extending through the openings towards the other side of the openings, and in each pair of openings two rigid support members extending into the opening in one of the grid structures, one from each side of the opening adjacent the spring means, a single rigid support member extending into the opening in the other of the grid structures from the opposite side of the opening to the spring means, the two rigid support members and the single rigid support member being adapted to contact the corresponding fuel pin at points on the corners of a triangle, the spring means being adapted to hold the fuel pin biassed against said rigid support members.

8. A spacer grid as claimed in claim 7 wherein the spring means is arranged to act on the fuel pins at a point longitudinally between the two rigid support members in the one opening and the single rigid support member in the other opening in each corresponding pair of openings in the two grid structures.

9. A spacer grid as claimed in claim 7 wherein the spring means comprises a bow spring mounted longitudinally between each corresponding pair of openings in the two grid structures such that the bow springs will bear on fuel pins at a point intermediate between the two grid structures.

10. A spacer grid as claimed in claim 7 wherein stop members are provided in the corresponding pairs of openings in the two grid structures to limit lateral movement of fuel pins passing therethrough away from contact with the rigid support members against the action of the spring means, a single stop member being provided extending into the opening of each pair of openings which has the two rigid support members, this single stop member extending into the opening from the side of the opening having the spring means, two stop members being provided extending into the other opening of the pair of openings which has the single rigid support member, the two stop members extending into the opening one from each side of the opening adjacent to the side of the opening having the spring means, the stop members being located so as to be spaced from the fuel pins with the fuel pins held in contact with the support members in the pairs of openings by the spring means.

\* \* \* \* \*